April 15, 1958     J. E. GROSS     2,831,162
TIME-INTERVAL MEASURING DEVICE
Filed May 9, 1955     2 Sheets—Sheet 1
Fig. 1
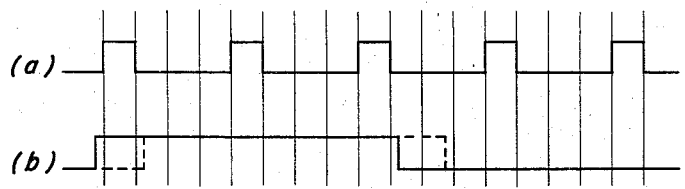
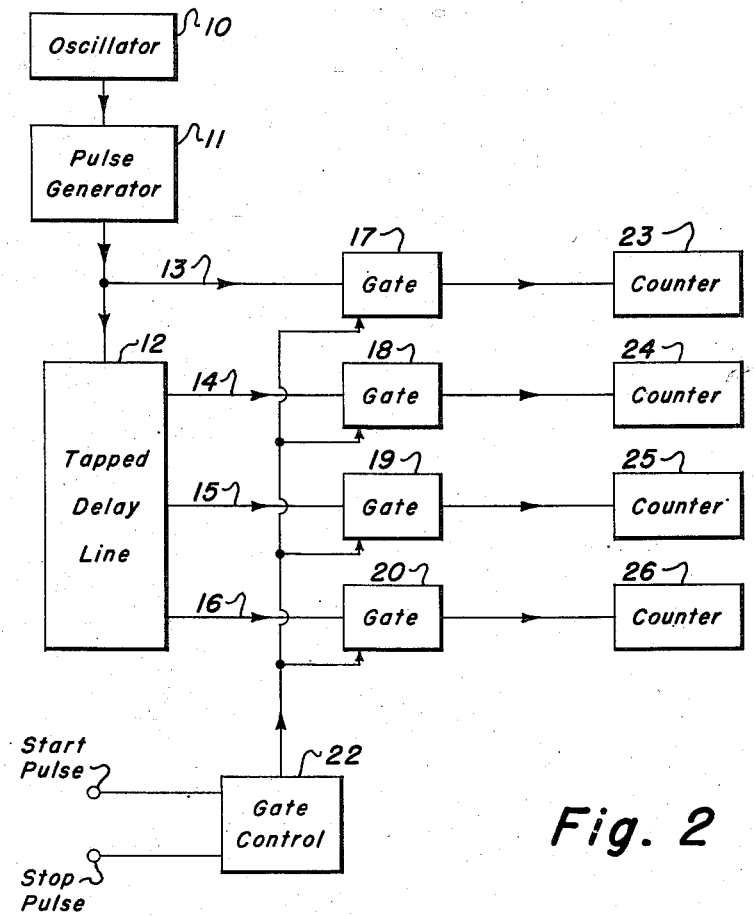
Fig. 2
INVENTOR:
Julian E. Gross
BY
Roland A. Anderson
Attorney INVENTOR:
Julian E. Gross

United States Patent Office 2,831,162
Patented Apr. 15, 1958

2,831,162

TIME-INTERVAL MEASURING DEVICE

Julian E. Gross, Albuquerque, N. Mex., assignor, by mesne assignments, to the United States of America as represented by the United States Atomic Energy Commission Application May 9, 1955, Serial No. 507,185

2 Claims. (Cl. 324—68)

This invention relates to those electronic time-interval measuring devices known as direct-counting instruments, which operate by counting periodic pulses during the time interval being measured. The length of the time interval is the product of the total number of pulses and the period of the pulse waveform, or "pulse period."

In such instruments it is common that the pulse waveform is continuously available and that a "start pulse" at the beginning of the time interval opens an electronic gate, allowing the pulses to pass to the counter. A "stop pulse" at the end of the time interval closes the gate to prevent further counting. This procedure is known as "random gating," since there is no relation between the timing of the gate and the occurrence of specific pulses. Random gating has the disadvantage of limiting the accuracy of time measurement to plus or minus one pulse period.

How two measurements of equal time intervals can differ by one pulse period may be seen by considering a case where the gate and, of course, the time interval, are only long enough to encompass two pulses. If the gate opens immedeiately prior to the first pulse and closes immediately after the second, both pulses are admitted to to the counter and are counted. The time interval is recorded as two pulse periods. However, if the gate opens immediately after the first pulse it then closes after the second pulse enters. Only one pulse is counted and the time interval is recorded as one pulse period.

Another possibility of obtaining differing measurements of equal time intervals arises when the gate opens or closes during a pulse, allowing only a fraction of the pulse to proceed to the counter. Since the counter is designed ot operate on whole pulses, it may or may not count the fraction.

It is obvious that an increase in the pulse repetition rate decreases the length of the pulse period and thereby increases the accuracy of the system. The maximum counting rate of the counters then becomes the limiting factor in the search for better accuracy. Direct-counting systems of the prior art are now limited in this manner.

This invention has the object of enabling increasing the highest accuracies of prior-art direct-counting systems by a factor of two or more. By using the embodiment to be described, the accuracy may be increased by a factor of four.

The way in which this and other objects of the invention are attained will be clear from examination of the description to follow in conjunction with the accompanying drawings, in which:

Fig. 1 shows the gate and pulse waveforms as they exist in the prior art;

Fig. 2 is a block diagram of the preferred embodiment of the present invention;

Figure 3:
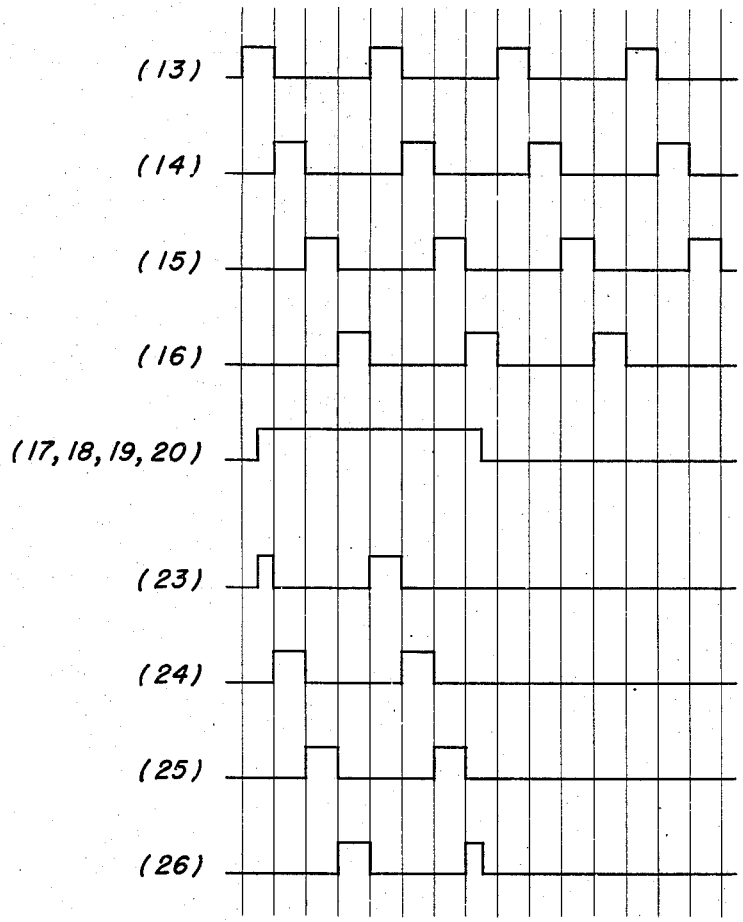
Fig. 3 shows the waveforms present at several points in the preferred embodiment during operation.

Referring to Fig. 1, diagram (a) shows a pulse train of a typical prior-art direct-counting system. Diagram (b) is in time relation with diagram (a) and indicates two possible positions of the gate waveform, which is slightly longer than two pulse periods. It is seen that when the gate occurs at the time shown by continuous outline, three pulses will be passed by the gate to the counter, and the gate time interval will be counted as three pulse periods in length. When the gate occurs at the time shown by the broken outline, however, only two pulses will be passed and counted, giving rise to a time interval measurement of two pulse periods. Thus, Fig. 1 illustrates the inherent accuracy of plus or minus one pulse period found in direct-counting systems of the prior art.

Referring next to Fig. 2, oscillator 10 emits a fixed-frequency signal to pulse generator 11 which in turn emits pulses of the same frequency to tapped delay line 12 and to bus 13. The pulses leave the delay line on buses 14, 15 and 16 after being delayed one-fourth, one-half and three-fourths of a pulse period respectively. At the beginning of the time interval to be measured a "start pulse" is generated by circuitry not shown, causing gate control 22 to open gates 17, 18, 19 and 20 simultaneously, allowing pulses on all four buses to proceed to counters 23, 24, 25 and 26 where they are counted. A "stop pulse" at the end of the time interval acts through gate control 22 to close the gates simultaneously. Then an operator averages the accumulated counter totals and multiplies the average by the pulse period to obtain the time interval measurement.

Fig. 3 shows the waveforms present at various points in the circuit, identified by the appropriate reference characters. The pulse train is shown as it appears on bus 13 and, successively delayed ¼, ½ and ¾ of a pulse period on buses 14, 15 and 16 respectively. In this instance the gate waveform appearing at gates 17, 18, 19 and 20 is exactly 1¾ pulse periods in length. The gate begins at the midpoint of one pulse and ends at the midpoint of another. It is seen that counters 23 and 26 each receives 1½ pulses, counters 24 and 25 each receives 2 pulses. Accordingly, counter 23 may register one or two counts; counter 24, two counts; counter 25, two counts; and counter 26, one or two counts. The sums of the possible combinations of counter totals are centered on seven, so any one is equal to 7±1. The measured time interval is then the average individual counter sum multiplied by the pulse period T:

$$¼(7±1)T = 1¾T ± ¼T$$

The time interval has been measured as 1+¾ T, and the accuracy of measurement is ±¼ T. It is seen that by use of this invention the accuracy is four times better than that of the prior art.

Notice that the total registered by any counter differs from any other total by no more than two counts. This is true regardless of the length or time of occurrence of the gate, making possible the use of a simplified counter system. Such a system has only one complete counter which totals the pulses admitted by the gate. The remaining counters need be only complex enough to show whether their sums are equal to that of the complete counter or differ from it by plus or minus one count. A group of one-decade counters will accomplish the task, indicating only the last digit of each total admitted. A group of one-ternary or two-binary counters will also suffice, effecting an even greater equipment economy.

In general, the pulse train is subjected to a series of $n$ equal time delays, $$\frac{1}{n+1}$$

being a simple, proper fraction of the pulse period. Each of $n+1$ counters counts $m$ pulses during the time interval, which is measured as $$\frac{1}{n+1}(m\pm 1)T = \frac{m}{n+1}T \pm \frac{1}{n+1}T$$

Therefore it can be said in general that the present invention reduces the possible error in time-interval measurement to $$\frac{1}{n+1}$$

of the possible error in the prior art.

Although, for purposes of illustration, a system using $n=3$ has been described, it should be understood that $n$ can be any integer and that an increase in accuracy in proportion to $n+1$ can be expected within circuit limitations as to speed of response. Other departures from the diagram of Fig. 2 can be made by one skilled in the art without leaving the sphere and scope of the present invention as claimed below.

I claim:

1. In a time-interval measuring device in which constant-frequency electrical pulses are counted during the time interval, means for successively delaying the pulses for a fraction of the pulse period so that a final delay of one period is obtained, and means for counting the pulses before and after each stage of delay during the time interval whereby a plurality of totals is obtained which may be averaged and multiplied by the pulse period to obtain an accurate time-interval measurement.

2. In a time-interval measuring device in which constant-frequency electrical pulses are counted during the time interval; means for successively delaying the pulses $$\frac{1}{n}$$

of the pulse period, $n$ being an integer, whereby a final delay of one period is obtained and whereby the pulses appear successively delayed on $n+1$ buses; a first means for counting the pulses appearing on one bus; a second means for counting the pulses appearing on each remaining bus to at least the least significant digit of the count of the first counting means; means for simultaneously enabling the first and second counting means at the beginning of the time interval; and means for simultaneously disabling the first and second counting means at the end of the time interval, whereby a correction may be computed to be applied to the count of the first counting means and multiplied by the pulse period to obtain an accurate time-interval measurement.

References Cited in the file of this patent
UNITED STATES PATENTS

| | | |
|---|---|---|
| 2,523,244 | Woodward | Sept. 19, 1950 |
| 2,740,091 | Goulding | Mar. 27, 1956 |